United States Patent [19]

Nara

[11] Patent Number: 4,555,080
[45] Date of Patent: Nov. 26, 1985

[54] AUTO DEVICE MOUNTING STRUCTURE
[75] Inventor: Hirotoshi Nara, Tokyo, Japan
[73] Assignee: Clarion Co., Ltd., Tokyo, Japan
[21] Appl. No.: 602,589
[22] Filed: Apr. 20, 1984
[30] Foreign Application Priority Data Apr. 28, 1983 [JP] Japan ............................... 58-63134

[51] Int. Cl.$^3$ .............................................. G12B 9/00
[52] U.S. Cl. ............................ 248/27.1; 248/DIG. 6
[58] Field of Search .................. 248/27.1, 27.3, 205.1, 248/DIG. 6; 312/242, 245; 339/126 R; 220/3.5, 3.6; 70/58

[56] References Cited

U.S. PATENT DOCUMENTS

| | | | |
|---|---|---|---|
| 2,143,517 | 1/1939 | Huff | 220/3.5 |
| 3,960,349 | 6/1976 | Schierholz | 248/27.1 |
| 3,994,148 | 11/1976 | Anderson | 248/553 X |
| 4,031,721 | 6/1977 | Anderson | 248/553 X |
| 4,047,686 | 9/1977 | Porter | 248/552 |
| 4,083,620 | 4/1978 | Burgin | 248/551 X |
| 4,231,625 | 11/1980 | Perez | 312/242 X |
| 4,313,584 | 2/1982 | Fukunaga | 312/242 X |
| 4,447,030 | 5/1984 | Nattel | 248/27.1 |
| 4,462,564 | 7/1984 | Alves | 248/27.1 |

FOREIGN PATENT DOCUMENTS 761605 11/1956 United Kingdom ............... 248/27.3

Primary Examiner—J. Franklin Foss
Attorney, Agent, or Firm—Flynn, Thiel, Boutell & Tanis

[57] ABSTRACT

The auto device mounting structure includes a sleeve-shaped bracket means adapted to receive an auto device and to be fixed to an instrument panel behind an aperture. The mounting structure comprises plural grooves formed in the outer case of the auto device which are elongated laterally and are spaced in the back and forth direction, and a slide plate having engagement claws slidably engageable with the grooves and fixture claws slidably and fixedly engageable with semi-sheltered cuts of the bracket means slide plate, which is conjoined with the auto device by engagement of the engagement claws with selected one of the grooves and fitted to the bracket means by engagement of the fixture claws with the semi-sheltered cuts, is slid laterally so as to fixedly engage the fixture claws with the semi-sheltered cuts, thereby mounting the auto device in the bracket means at a selectively inserted position with respect to the instrument panel.

7 Claims, 4 Drawing Figures

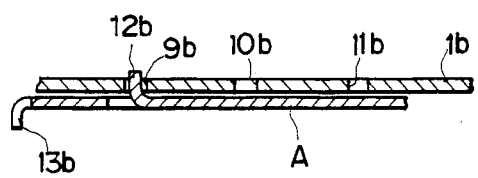
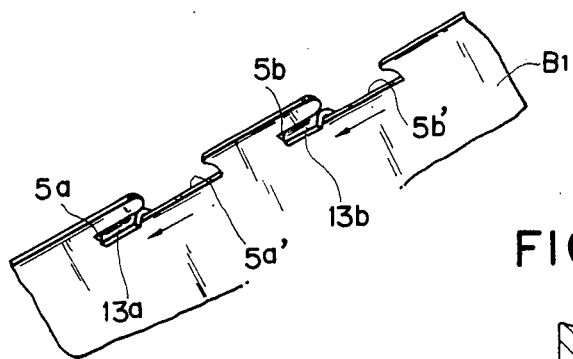
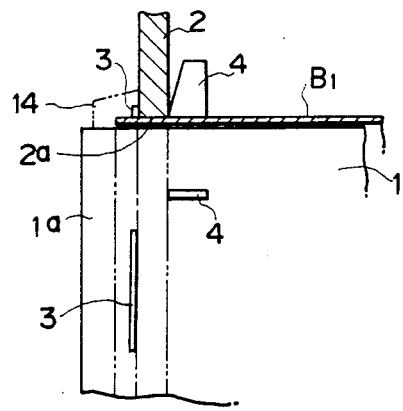

AUTO DEVICE MOUNTING STRUCTURE

FIELD OF THE INVENTION

This invention relates to an auto device mounting structure for mounting an auto device such as an auto radio or auto stereo in position in a car.

BACKGROUND OF THE INVENTION

In some cars, an instrument panel or mounting board to support an auto radio and other auto devices is recessed away from the driver's seat.

By the prior art mounting structure, the position of an auto device is uniformly fixed with respect to the instrument panel. Therefore, if the instrument panel is remote from the driver's seat, the front face of the auto device is also positioned remote from the seat, thereby making it difficult for a driver to readily touch and distinguish various manually-operated buttons or knobs on the front face of the auto device.

OBJECT OF THE INVENTION

It is therefore an object of the invention to provide an auto device mounting structure capable of adjusting placement of an auto device in the back and forth direction with respect to an instrument panel of a car.

SUMMARY OF THE INVENTION

In accordance with the invention, there is provided an auto device mounting structure for mounting an auto device in position in a car which comprises:

bracket means having a caliber corresponding to the outer dimension of the auto device;

a plurality of grooves formed in an outer case of the auto device which are elongated across a direction of insertion thereof into said bracket means and which are spaced in said direction;

at least one cut formed in said bracket means; and a slide plate having at least one engagement claw engageable with any selected one of said grooves and at least one fixture claw engageable with said cut.

The invention will be better understood from the description hereinbelow given by way of a preferred embodiment illustrated.

BRIEF DESCRIPTION OF THE DRAWINGS

FIGS. 1 through 4 illustrate an auto device mounting structure embodying the invention, of which:

FIG. 1 is a perspective view as viewed from the bottom of the device;

FIG. 2 is a cross-section along the II—II line of FIG. 1;

FIG. 3 is a perspective partial enlargement of a bracket member with semi-sheltered cuts thereof engaging engagement claws; and FIG. 4 is an enlarged, partial cross-sectional view showing an auto device fixed to an instrument panel by the mounting structure.

DETAILED DESCRIPTION OF THE PREFERRED EMBODIMENT

Figure 1:
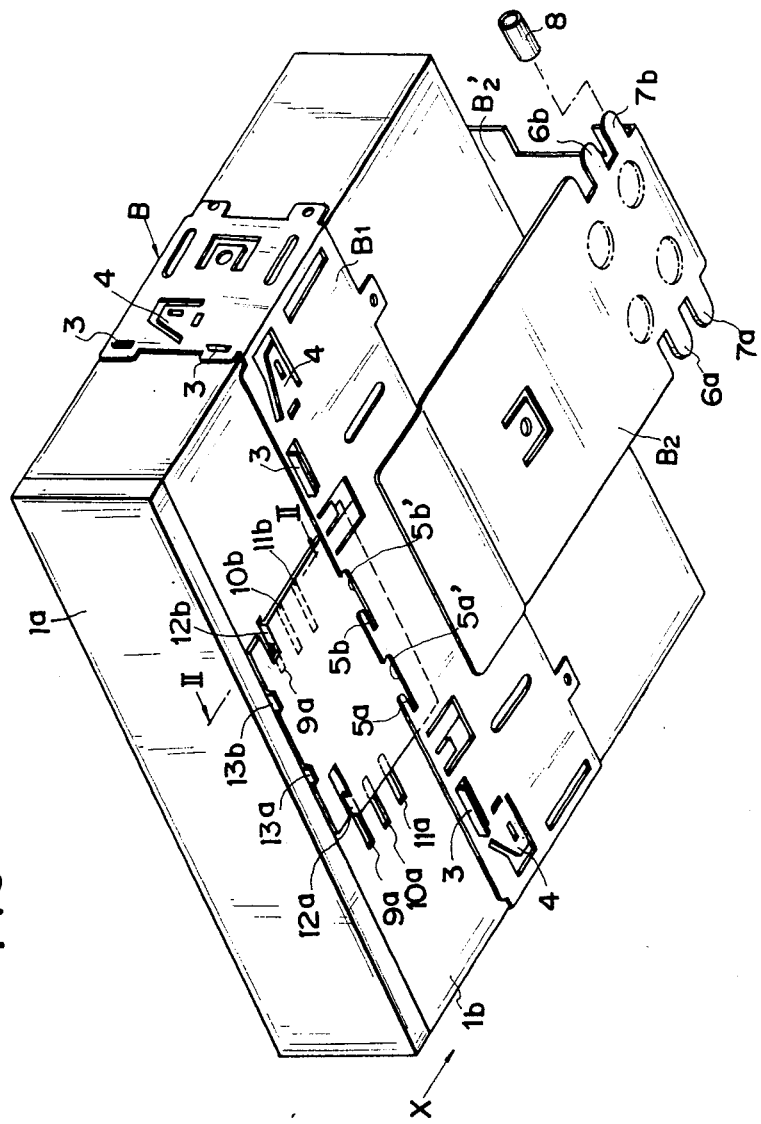

An auto device 1, e.g. a car stereo, includes a front face 1a which is provided with not-illustrated features such as manually-operated buttons, a cassette insertion aperture, mode displayers and other necessary means. The auto device 1 will be fixed to a mount board or instrument panel 2 (FIG. 4) of a car by the mounting structure of the invention which generally comprises bracket means B (FIG. 1) and a slide plate A (FIG. 2). The bracket means B is made from metal and consists of a sleeve-shaped bracket member $B_1$ having a rectangular opening therein with height and width dimensions corresponding to the outer dimensions of the auto device 1 and a U-shaped rear frame $B_2$ extending rearwardly from the bracket member $B_1$. The bracket member $B_1$ is selectively shaped along the front edge thereof nearer to the front face 1a of the auto device 1 in FIG. 1 so as to form an adequate number of pair of stoppers 3 and 4. Each paired stoppers 3 and 4 are spaced in the back and forth direction by a distance substantially the same as the thickness of the instrument panel 2, as shown in FIG. 4. The rear stopper 4 and the front stopper 3 sandwich the instrument panel 2 along an aperture 2a thereof from the opposite sides to fixedly support the bracket means B there. The bottom plate of the bracket member $B_1$ has formed at a middle portion along the front edge thereof a pair of L-shaped or semi-sheltered cuts 5a and 5b which engage engagement claws (which will be described later) of the slide plate A to conjoin the slide plate A with the bracket means B. The rear frame $B_2$ consists of two parallel legs or plates (only one is illustrated) coplanarly extending from the top and bottom plates of the bracket member $B_1$ and a light or end plate $B_2'$ uniting these two parallel plates. Each parallel plate of the rear frame $B_2$ has two pairs of tongues 6a, 6b, 7a and 7b coplanarly laterally extending at the rear end portion thereof. Reference numeral 8 denotes a vinyl tube which will be capped on the tongues.

The bottom plate 1b of the outer case of the auto device 1 has paired engagement grooves 9a, 9b, 10a, 10b, 11a and 11b which are elongated laterally and are spaced in the back and forth direction. The embodiment illustrated has three pairs of the grooves, but they may be four or more.

The slide plate A has engagement claws 12a and 12b which are slidably engageable with any selected pair of the grooves 9a through 11b. The slide plate A also has fixture claws 13a and 13b which are engageable with the semi-sheltered cuts 5a and 5b of the bracket means B.

To mount the auto device 1 at the deepest position (remotest from the driver's seat), the bracket means B is inserted into the aperture 2a of the instrument panel 2, with the tongues 6a through 7a and the rear stoppers 4 maintained coplanar or not bent, up to a position whereat the front stoppers 3 contact the front face of the instrument panel 2. Then, the rear stoppers 4 are bent so that the tapered edges thereof yieldably contact the back face of the instrument panel 2. Thus the bracket means B is fixed in position behind the aperture 2a.

The slide plate A is fitted to the bottom plate 1b of the auto device 1, with the engagement claws 12a and 12b engaging the right ends of the paired grooves 9a and 9b nearest to the front face 1a of the auto device 1. The auto device 1 conjoined with the slide plate A is inserted in the bracket means B up to a position whereat the rear end of the auto device 1 contacts the end plate $B_2'$ of the rear frame $B_1$, and the fixture claws 13a and 13b enter non-sheltered portions 5a' and 5b' of the semi-sheltered cuts 5a and 5b, or in other words the portions extending parallel to the direction of insertion of the device 1. From this position, the slide plate A is slid to the left so that the fixture claws 13a and 13b enter the sheltered portions of the cuts 5a and 5b as shown in FIG. 3, or in other words the portions extending perpendicular to the direction of insertion of the device 1. Thus the auto device 1 is held in the bracket means B, immovably in the back and forth direction, by the slide plate A, and immovably in the right and left direction or in the up and down direction by the bracket member B₁. By finally providing an ornamental frame on the front face 1a of the auto device 1, the assemblage is completed.

If the instrument panel 2 is somewhat remote from the driver's seat, it is preferable to position the front face 1a of the auto device 1 nearer to the driver's seat. In this connection, the tongues 7a and 7b are bent upwardly and are capped with the vinyl tubes 8 to contact and stop the back face of the auto device 1 in front of the end plate B₂'. The bracket means B is thereafter inserted in the aperture 2a in the same manner as described before. The engagement claws 12a and 12b of the slide plate A are inserted in the second paired grooves 10a and 10b of the auto device 1 instead of the above-used grooves 9a and 9b. The auto device 1 conjoined with the slide plate A is inserted in the bracket means B until the back face of the auto device 1 contacts the capped tongues 7a and 7b, and is slid to the left. Thus the auto device 1 is fixed to the instrument panel at a position slightly projecting therefrom toward the driver's seat by a distance corresponding to that between the grooves 9a and 10a. The third paired grooves 11a and 11b and the other paired tongues 6a and 6b are used to position the auto device 1 nearest to the driver's seat. The mounting process thereof will be obvious to one skilled in the art from the aforegoing explanation.

As described above, the invention provides an outer case of an auto device with plural grooves spaced in the back and forth direction, and employs a slide plate having engagement claws engageable with the grooves and fixture claws engageable with semi-sheltered cuts of bracket means, so that the slide plate conjoined with the auto device by engagement of the engagement claws with selected grooves is inserted and laterally slid in the bracket means so as to fixedly engage the fixture claws with the semi-sheltered cuts, thereby mounting the auto device in a selectively inserted position in the bracket means. Thus the invention makes it possible to adjust the position of the auto device in the back and forth direction in accordance with the distance between the instrument panel and the driver's seat, so as to allow a driver to readily touch and see the front face of the auto device.

The embodiments of the invention in which an exclusive property or privilege is claimed are defined as follows:

1. An auto device mounting structure for mounting an auto device in position in a car, comprising:
   bracket means having a caliber corresponding to the outer dimension of said auto device;
   a plurality of grooves formed in an outer case of said auto device, said grooves being elongated in a direction transverse to a direction of insertion of said auto device into said bracket means and said grooves being spaced in said direction of insertion;
   at least one cut formed in said bracket means; and
   a slide plate having at least one engagement claw engageable with any selected one of said grooves and having at least one fixture claw engageable with said cut;
   wherein said bracket means includes a sleeve-shaped bracket member and a rear frame which is connected to and extends coplanarly and rearwardly from said bracket member, said rear frame terminating at an end plate and having one or more tongues thereon which are frontwardly spaced from said end plate and can contact a back face of said auto device when bent vertically.

2. An auto device mounting structure for mounting an auto device in position in a car, comprising:
   bracket means having a caliber corresponding to the outer dimension of said auto device;
   a plurality of grooves formed in an outer case of said auto device, said grooves being elongated in a direction transverse to a direction of insertion of said auto device into said bracket means and said grooves being spaced in said direction of insertion;
   at least one cut formed in said bracket means; and
   a slide plate having at least one engagement claw engageable with any selected one of said grooves and having at least one fixture claw engageable with said cut;
   wherein said bracket means includes at least one pair of stoppers which are spaced in said direction of insertion by a distance corresponding to the thickness of a mount board of the car so as to sandwich the mount board from opposite sides thereof; and
   wherein said bracket means includes a sleeve-shaped bracket member and a rear frame which is connected to and extends coplanarly and rearwardly from said bracket member, said rear frame terminating at an end plate and having one or more tongues thereon which are frontwardly spaced from said end plate and can contact a back face of said auto device when bent vertically.

3. An apparatus for removably mounting an auto device in a vehicle, comprising:
   a bracket which is adapted to be fixedly secured to the vehicle and into which said auto device can be removably inserted in a first direction;
   means defining in an outer case of said auto device a plurality of engagement openings which are spaced from each other in said first direction;
   a slide member supported for movement relative to said auto device in directions parallel to said first direction and having thereon an engagement claw which can be removably inserted in a selected one of said engagement openings in said outer case to prevent movement of said auto device relative to said slide member in said first direction; and
   means actuable when said bracket and said slide member are in a predetermined position with respect to each other for releasably securing said slide member and said bracket against relative movement away from such position in directions parallel to said first direction.

4. The apparatus according to claim 3, wherein said means for releasably securing said slide member and said bracket against relative movement includes said openings in said outer casing being grooves which extend in a second direction approximately perpendicular to said first direction, includes said slide member being supported for movement relative to said auto device in directions parallel to said second direction, includes said bracket having therein an L-shaped cut which includes a first portion extending generally parallel to said first direction and a second portion extending generally parallel to said second direction, and includes said slide member having thereon a fixture claw which is engageable with said L-shaped cut in said bracket.

5. The apparatus according to claim 4, wherein said outer casing has a plurality of further grooves therein, each said further groove being spaced in said second direction from a respective one of said first-mentioned grooves, wherein said bracket member has a further L-shaped cut therein which is spaced in said second direction from said first-mentioned cut, wherein said slide member has a further engagement claw thereon which is spaced in said second direction from said first-mentioned engagement claw and which is selectively engageable with said further grooves, and wherein said slide member has a further fixture claw thereon which is spaced in said second direction from said first-mentioned fixture claw and which is engageable with said further cut in said bracket.

6. The apparatus according to claim 5, wherein said auto device has a generally rectangular cross-sectional shape, wherein said bracket includes a sleevelike member having a rectangular opening therein, the length and width of said rectangular opening being slightly larger than the length and width of the cross-section of said auto device, and wherein said bracket includes a U-shaped rear frame having two parallel legs and a bight, an end of each said leg remote from said bight being fixedly secured to respective parts of said sleeve member which are disposed on opposite sides of said opening therein, one said leg of said rear frame having a tongue thereon which can be bent to a position in which it can engage a rear portion of said auto device in order to limit movement of said auto device in said first direction during insertion thereof into said bracket.

7. The apparatus according to claim 6, wherein said tongue has a length of vinyl tubing placed thereover.

* * * * *